(12) United States Patent
Nölle

(10) Patent No.: US 7,780,323 B2
(45) Date of Patent: Aug. 24, 2010

(54) ILLUMINATION APPARATUS

(76) Inventor: Jürgen Nölle, Ginsterstrasse 6, Rheinberg (DE) 47495

( * ) Notice: Subject to any disclaimer, the term of this patent is extended or adjusted under 35 U.S.C. 154(b) by 40 days.

(21) Appl. No.: 12/028,777

(22) Filed: Feb. 8, 2008

(65) Prior Publication Data

US 2009/0201689 A1    Aug. 13, 2009

(51) Int. Cl.
 *B60Q 1/26*    (2006.01)
(52) U.S. Cl. .................. 362/540; 362/485; 280/477
(58) Field of Classification Search .......... 362/485, 362/487, 505, 540–545; 40/588, 589, 590, 40/591, 606.01, 606.03, 607.04, 607.1, 610, 40/611.01, 611.12; 340/905, 908, 933, 936; 280/477
See application file for complete search history.

(56) References Cited

U.S. PATENT DOCUMENTS

| | | | | |
|---|---|---|---|---|
| 5,231,393 A * | 7/1993 | Strickland | .................... | 340/936 |
| 5,979,094 A | 11/1999 | Brafford, Jr. | | |
| 6,007,033 A * | 12/1999 | Casson et al. | ............ | 248/224.7 |
| 6,273,448 B1 * | 8/2001 | Cross | .......................... | 280/477 |
| 6,491,315 B2 * | 12/2002 | Hagen et al. | ............. | 280/164.1 |
| 6,637,718 B2 * | 10/2003 | Wilson | ........................ | 248/539 |
| 6,655,822 B1 * | 12/2003 | Sylvester | .................... | 362/485 |
| 6,734,792 B1 | 5/2004 | McElveen | | |
| 6,846,126 B2 * | 1/2005 | Parent | ..................... | 403/379.3 |
| 6,916,109 B2 * | 7/2005 | Julicher | ...................... | 362/487 |
| 7,001,052 B2 | 2/2006 | Cullinan | | |
| 7,207,589 B2 * | 4/2007 | Givens | ........................ | 280/477 |
| 7,347,017 B2 * | 3/2008 | Shaffer, Jr. | .................... | 40/591 |
| 2003/0128105 A1 | 7/2003 | Shaw | | |
| 2003/0184048 A1 | 10/2003 | Bonde | | |

FOREIGN PATENT DOCUMENTS

WO    WO 03/098097 A1    11/2003

* cited by examiner

*Primary Examiner*—Hargobind S Sawhney
(74) *Attorney, Agent, or Firm*—Von Rohrscheidt Patents

(57) ABSTRACT

An illumination apparatus comprises an illumination unit, a holder unit and a coupling unit with at least one coupling element suitable to be received in the receiver of the vehicle receiver hitch. The coupling unit pivots to rotate the holder unit from a generally horizontal transport position to a generally vertical operating position and the holder unit comprises an extendable stand which allows the illumination unit to be erected at a suitable illumination elevation.

27 Claims, 9 Drawing Sheets

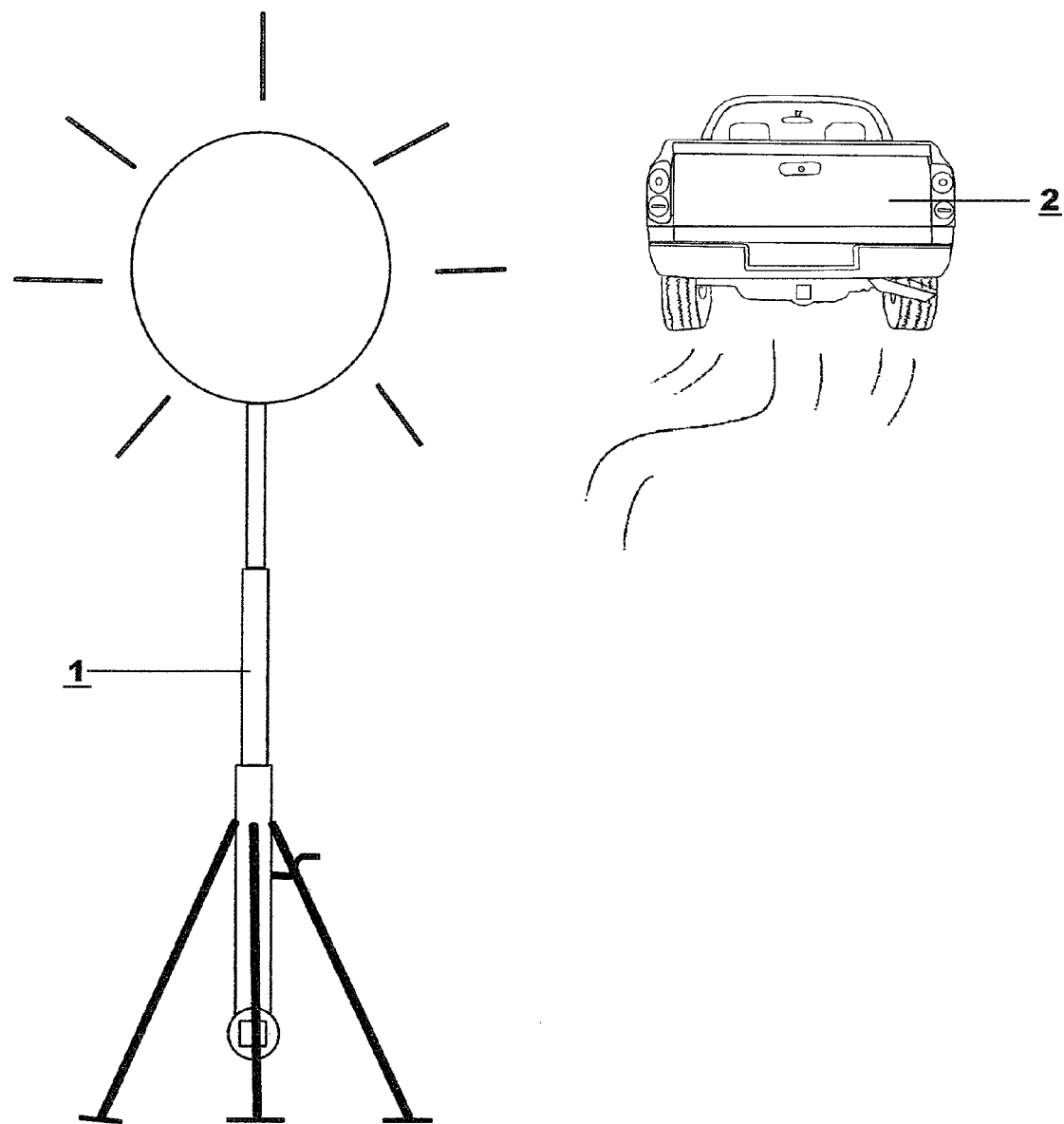

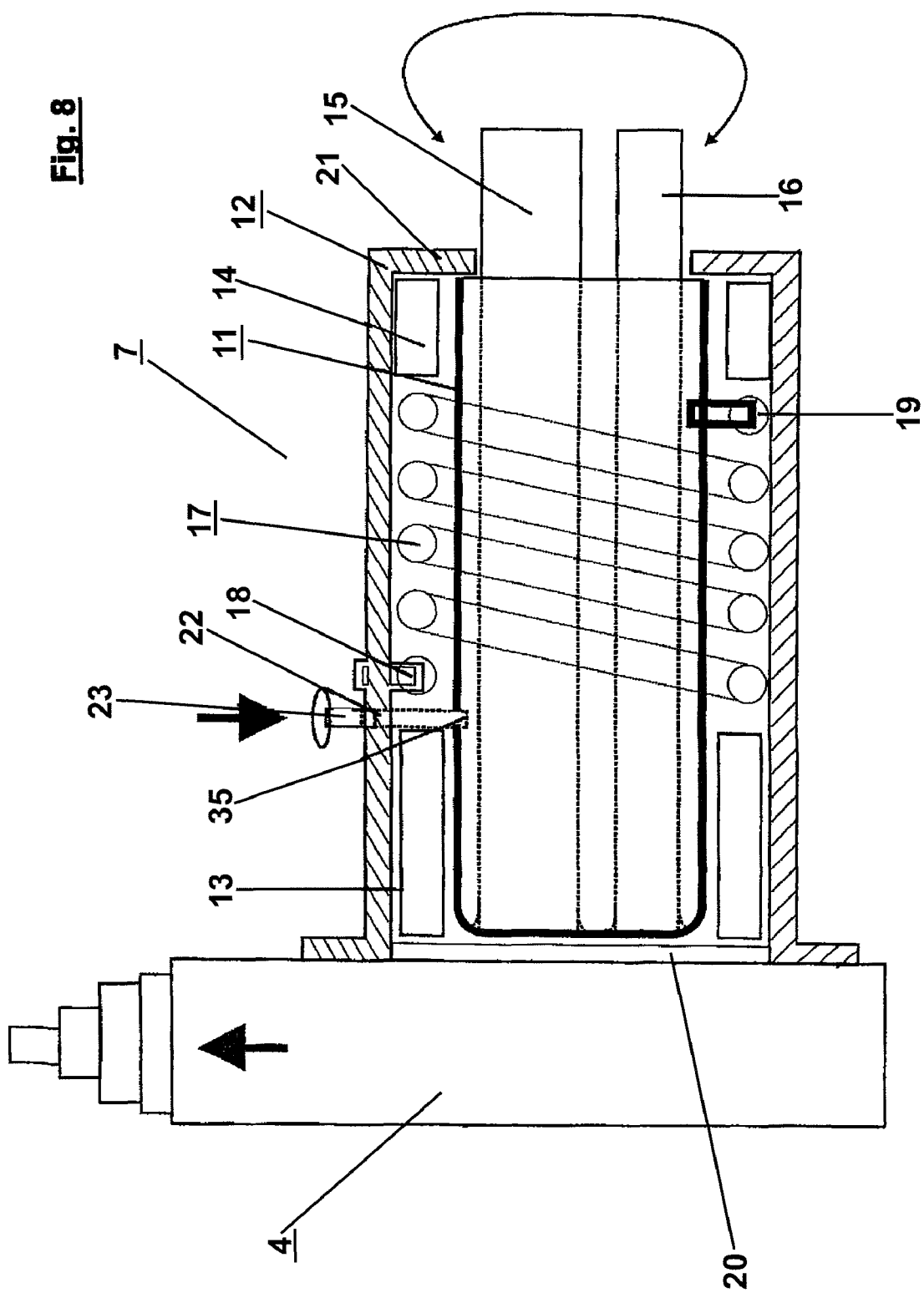

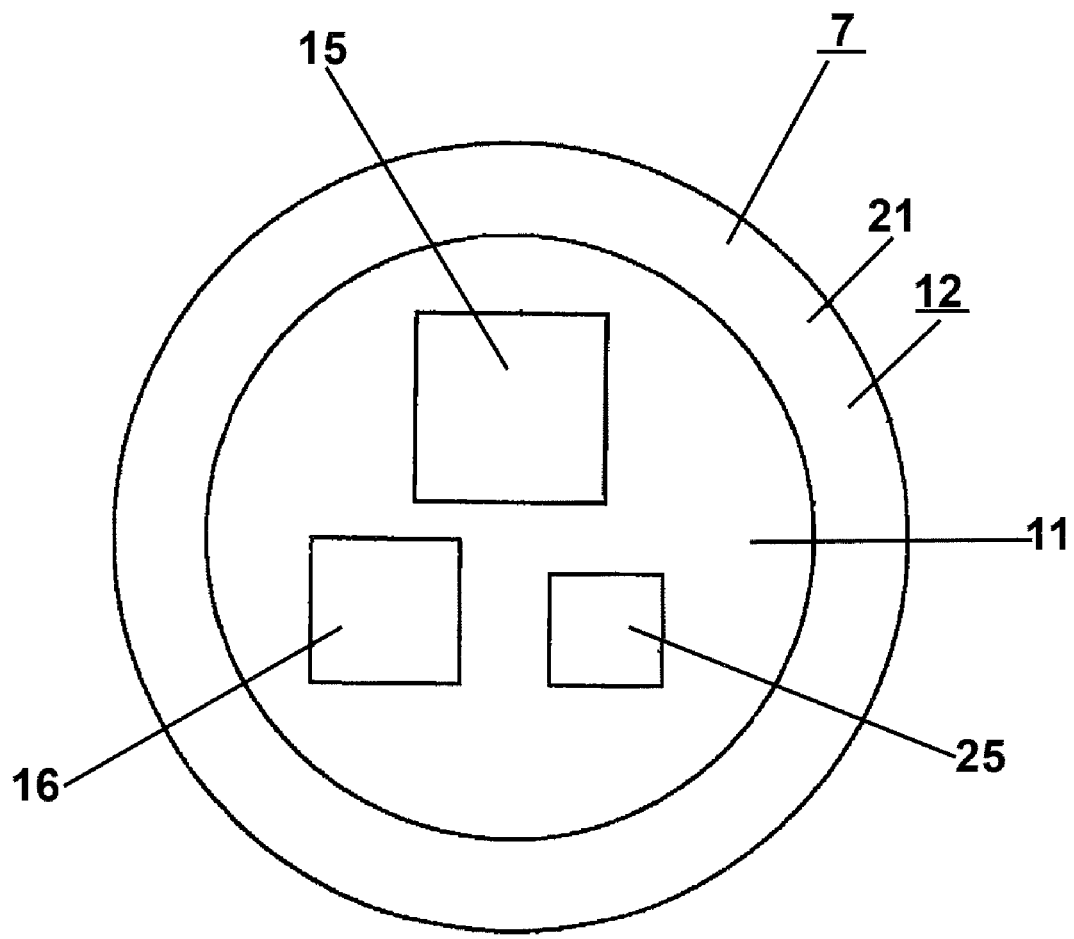

ILLUMINATION APPARATUS

BACKGROUND OF THE INVENTION

1. Field of the Invention

The present invention relates to an illumination apparatus, and particularly to a portable illumination apparatus which may be installed in the receiver of a common vehicle receiver hitch apparatus

2. Introduction

Portable illumination apparatuses are described in the art and are useful, in particular, for illuminating outside areas. This is especially so where the holder unit for the illumination unit is of a length that the illumination unit may be is deployed at a sufficient elevation for optimal illumination of a large area. Such illumination apparatuses are often used when a large area, remote from a fixed facility must be illuminated. For example, such devices are useful for lighting road construction areas and areas where the roadside repair of a vehicle must be accomplished after dark.

Typical prior art illumination apparatuses are affixed to an electrical generator and the entire apparatus is coupled to a vehicle, such as a pickup truck, as a trailer. This permits the device to be transported to the deployment location. An exemplary illumination apparatus of this type is described in PCT Application Number PCT/AU03/00599 and published as WO2003/098097 A1. The '599 application discloses an illumination device connected with an energy generation unit and the resulting apparatus is disposed as a trailer, which can be coupled to the tow hitch of a vehicle.

Devices like the one disclosed in the '599 application, which must be deployed with the affixed energy generation unit, disadvantageously require that the trailer be towed by a vehicle to the deployment location. This not only increases vehicle fuel consumption, but may also impair traffic safety, since a trailer with such an energy generation unit has relatively high weight and thus may impair the handling of the vehicle.

3. Objects of the Invention

It is, therefore, an object of the present invention to provide an illumination apparatus, which may be deployed at sufficient height that it is capable of adequate illumination of a relatively large area but which may be conveniently transported to the deployment location without the necessity of towing a trailer, and which may be conveniently deployed upon arrival. It is also an object of the invention to provide an illumination apparatus which may be conveniently installed in the receiver of a vehicle receiver hitch apparatus. It is also an object of the invention to provide for an illumination apparatus which may be conveniently installed in receivers of various standard sizes. Finally, it is an object of the invention to provide for an illumination apparatus which may be conveniently and safely transported to a deployment location and when there, be easily deployed.

BRIEF SUMMARY OF THE INVENTION

These and other objects are accomplished by the invention disclosed herein. According to the invention, the illumination apparatus comprises a holder unit and an illumination unit. The holder unit is disposed to be directly mounted to the receiver of a vehicle receiver hitch. Thus, it is not necessary to tow a trailer to a deployment location, since the holder unit need not be mounted to a trailer with an energy generator unit, but may be directly mounted to a tow hitch of a vehicle and transported attached there. When deployed, the illumination apparatus may be connected to a corresponding energy supply unit, such as a portable generator, which may be advantageously positioned on a loading surface of the transport vehicle, for example, in the bed of a pickup truck. Thus, during transport no impairment of traffic safety occurs as may be occasioned by pulling a trailer-mounted apparatus.

According to the present invention, the illumination unit may comprise standard lighting used only for illumination purposes. Alternatively, the illumination unit may comprise a lighted display, such as warning sign which may be used, for example to inform motorists of road construction work. The illumination unit may also comprise a lighted traffic signal, such as a standard green-yellow-red signal device.

The illumination unit may also comprise a spreadable lamp shade, in which at least one illuminant is disposed. The lamp shade is comprised of flexible material and may be extended by means of suitable spreader elements and by a respective spreader mechanism, so that the light of the illuminant, which is substantially emitted punctiform, becomes an even and defuse light through the lamp shade, which prevents glare and provides even illumination of the deployment location. In order to improve the illumination at the deployment location, the lamp shade is partially provided with a reflective layer on the inside, which is preferably provided in the upper portion of the lamp shade, so that little or no light escapes in the upward direction but rather, light rays will be reflected by the top and be deflected downward.

The holder unit of the illumination apparatus is fixed to a coupling unit by which the holder unit may be mounted to the receiver of a vehicle receiver hitch. The coupling unit is disposed so that a mounting of the illumination apparatus in the receiver may be conveniently performed. Simple mounting means, like a pin or bolt installed through the receiver and through the coupling unit and affixed by a nut, snap ring, cotter pin or other fixation means are provided. Such devices are commonly used for mounting ball hitch devices, bike racks and other mechanisms to the receiver and facilitate the simple mounting and disengaging of the holder unit at the receiver hitch.

In another preferred embodiment of the invention the coupling unit comprises three coupling elements, each with a square cross section of a size different from the others. It may be recognized that the receivers of vehicle receiver hitches are constructed in a variety of sizes. Thus, the invention has the advantage that the coupling unit acts as an adapter by providing a respective coupling element for each of the common sizes of receivers of vehicle receiver hitches. Each of the coupling elements may be inserted into a corresponding size receiver of a receiver hitch in a locked manner. The fixation of the coupling element at the tow hitch can be performed by means of metal bolts or pins, which are typically used for this purpose and which are inserted transverse to the long axis of the receiver, through the side wall of the receiver and the corresponding coupling element of the coupling unit. Nuts may be applied to the bolts and the bolts or pins can be additionally secured against unintentional disengagement by a safety element, such as a cotter pin or snap ring.

The lengths of the sides of the square cross sections of the three coupling elements are advantageously 1.25", 2", and 2.5" respectively. These dimensions correspond to the sizes of square openings found in receivers of vehicle receiver hitches.

The coupling unit further comprises an inner tube and an outer tube, wherein the inner tube is rotatably supported in the outer tube. Through the rotation of the outer tube relative to the inner tube and vice versa, the holder unit, which is connected to the coupling unit at the outer tube, may be deployed to a general vertical orientation from the generally horizontal position used for transport, and vice-versa. The illumination unit, which is disposed at the end of the holder distal to the coupling unit, is thereby deployed to an advantageous height. The illumination unit may be pivotably connected to the holder unit so that it may be pivoted to a convenient position during transport and pivoted to erect deployment on arrival. This configuration yields the advantage that the illumination apparatus is mounted to the receiver in the collapsed horizontal position and, during transport, is behind the vehicle in a space saving manner, unexposed to any wind forces. At the deployment location, a simple pivoting of the holder unit with the illumination unit can be performed to erect the illumination apparatus in the vertical position, where the illumination unit may perform its function. The illumination apparatus is thus pivotable from a horizontal transport position to a vertical operating position and vice-versa. Preferably the horizontal position is accomplished on the side of the vehicle opposite the side where traffic travels against the vehicle carrying the illumination apparatus. Thus, where traffic travels in the right lane, the generally horizontal position (or transport position) is preferably to the right side of the vehicle. In this way the possibility that an illumination apparatus in transport may be struck by passing vehicles or otherwise create a danger for passing vehicles, is minimized.

The rotating connection between the inner and outer tubes may be accomplished by a slide element supported in each end portion of each tube. These slide elements facilitate a safe and smooth rotation of the inner tube relative to the outer tube with a substantial reduction of clearance, which creates a high quality and easy to operate illumination apparatus. The inner tube can be connected in a torque-proof connection to the coupling element which is received in the receiver of a vehicle receiver hitch. A suitable sliding element may comprise roller bearings.

Alternatively, the slide element may comprise a slide ring, which is connected in its entirety with a portion of the inner circumferential surface of the outer tube, or alternatively, the outer circumferential surface of the inner tube, so that shocks occurring during transport, in particular while driving at off road deployment locations, do not have a detrimental effect on the rotatable support of the inner tube with respect to the outer tube. Such a slide ring may advantageously be constructed of Teflon®. Through this embodiment of the slide element, or the slide ring, no additional lubrication of the slide element adjacent the tube rotating with respect to the slide element need be present. The used of the Teflon® slide ring allows the construction of an erectable illumination apparatus which is virtually maintenance free and is constructed from low wear elements.

In the preferred embodiment of the invention, a spring element is also disposed between the inner and outer tubes. The spring element is used for generating a reversal force, biased in favor of the erect (or generally vertical) position of the holder unit. In this way, the raising of the illumination apparatus from a horizontal into a vertical position is aided by the spring element and, similarly, pivoting of the illumination apparatus from the vertical position into a horizontal position is dampened. Additionally, the spring element ensures that no hard stop occurs when the horizontal position is reached, thus preventing damage to the illumination unit, or to the illuminants included therein. The spring element may comprise any of a variety of elements, including, for example, an elastic rubber bungee.

However, it is preferable that the spring element comprise a coil spring, one end of which is connected to the inner tube and the other end of which is connected to the outer tube. This comparatively simple configuration adequately serves the above purpose and the connection between the coil spring with the tubes can be performed by welding the respective portions together. The coil spring is preferably disposed around the inner tube in the center portion of it and the mounting area of the spring element at the end of the tubes is defined by the slider element.

In the preferred embodiment of the invention, the end of the outer tube proximate the coupling element comprises an annular portion extending inward over the end of the inner tube, thus preventing the inner tube from escaping from the outer tube. At the opposite end the outer tube comprises a flange. The flange is fixed, by bolts, welding or other suitable fastening means, to the holder unit. The inner tube is connected to the coupling unit in a torque-proof manner. Therefore, when a coupling element is mounted in a receiver of a receiver hitch, the inner tube is held in a fixed position and the rotation of the outer tube relative to the inner tube can be performed for pivoting the holder unit with the illumination unit. The coupling element and the inner tube remain motionless as the outer tube is rotated and the holder unit is erected from the generally horizontal position to the generally vertical position.

An opening in the outer tube is provided and a corresponding opening in the inner tube is similarly provided, such that the openings are aligned when the holder unit is pivoted to vertical operating position. An interlocking element, such as a bolt, detent pin or pin, is inserted through the opening in the outer tube into the corresponding opening of the inner tube, thereby locking the illumination apparatus in the erect operating position.

According to another preferred embodiment, the holder unit further comprises a stand of adjustable axial length, thereby permitting the illumination unit to be deployed at a variety of heights for suitable illumination. The stand may, advantageously, be provided as a telescoping stand, with at least two telescope stages, so that the elevation adjustment of the illumination unit can be performed in a simple manner by telescoping the stand. For this purpose, the telescoping stand preferably comprises an adjustment element by means of which the stand can be telescoped. Such an adjustment element can be operated by a hand crank or similar device, and thus allows an elevation adjustment of the stand in a simple manner and may also ensure that the illumination unit is fixed at the desired elevation. The adjustment apparatus may also be driven pneumatically or hydraulically.

The end of the stand distal to the coupling unit is preferably connected to the illumination unit by a pivoting connection, so that the illumination unit can be pivoted into an operating position at the deployment location and pivoted into a transport position when in transport. The pivoting connection thus permits the illumination unit to be disposed behind the transport vehicle without protruding beyond its side. This avoids collision with passing vehicles and other objects.

It is also advantageous that the coupling unit comprise a damper element adjacent the location where the receiver receives the coupling element, so that a vibration free joint is formed. A damper element comprising a ring of elastic material is sufficient for this purpose.

In another preferred embodiment of the invention, the holder unit further comprises base elements, which are pivotably connected to the holder unit, and which are pivotable between a transport position and an operating position. The base elements provide stabilization of the illumination apparatus when it is erected while mounted to a receiver hitch, which may be useful when it is operated under inclement weather conditions. Additionally, the base elements permit the illumination apparatus to be erected while detached from the transport vehicle, without risk of falling over, since the base elements provide sufficient stability to the erect illumination apparatus. The base elements may also be telescoping and they may be made of any suitable material, such as metal, plastic, or a composite material.

The preferred embodiment of the invention thus provides a pivoting and telescoping illumination apparatus which can be conveniently and safely transported and which can be erected easily and safely without risk of pinching or squeezing of the operator's limbs or other body parts.

BRIEF DESCRIPTION OF THE DRAWINGS

The invention is described in detail with reference to the following drawings in which like reference numerals refer to like elements:

FIG. 7 is a perspective view of another preferred embodiment of the illumination apparatus detached from a transport vehicle and disposed in operating position;

FIG. 8 a longitudinal sectional view of the coupling unit of a preferred embodiment of the invention, and;

FIG. 9 is a top view of a coupling unit of a preferred embodiment of the invention.

DETAILED DESCRIPTION OF THE INVENTION

Table of Reference Numerals

Figure 1:
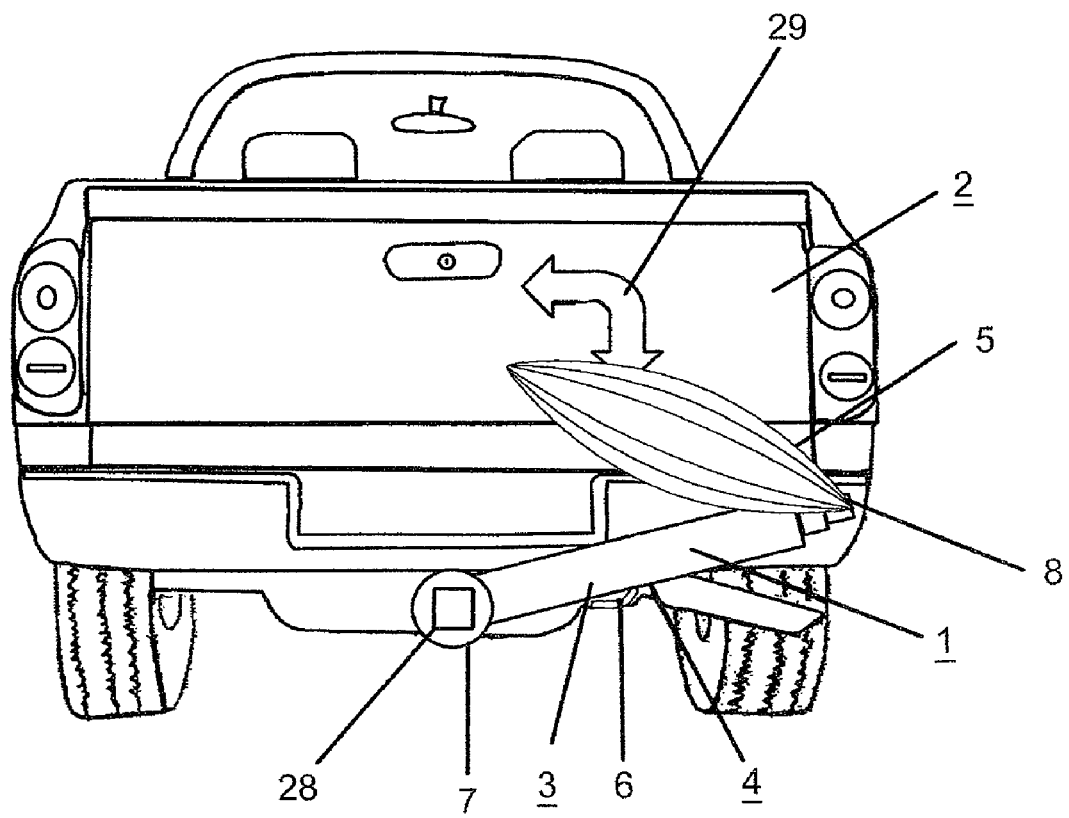
FIG. 1 is a perspective view of a preferred embodiment of the illumination apparatus mounted to a transport vehicle and disposed in transport position.

| Reference No. | Description |
| --- | --- |
| 1 | illumination apparatus |
| 2 | transport vehicle |
| 3 | stand |
| 4 | holder unit |
| 5 | illumination unit |
| 6 | hand crank |
| 7 | coupling unit |
| 8 | pivoting connection |
| 9 | telescope stage |
| 10 | telescope stage |
| 11 | inner tube |
| 12 | outer tube |
| 13 | slide element |
| 14 | slide element |
| 15 | coupling element |
| 16 | coupling element |
| 17 | spring element |
| 18 | end |
| 19 | end |
| 20 | plate |

-continued

Table of Reference Numerals

| Reference No. | Description |
| --- | --- |
| 21 | flange ring |
| 22 | opening |
| 23 | interlocking element |
| 24 | end plate |
| 25 | coupling element |
| 26 | opening |
| 27 | opening |
| 28 | receiver hitch |
| 29 | arrow |
| 30 | warning text |
| 31 | base element |
| 32 | arrow |
| 33 | ground |
| 34 | end |
| 35 | opening |

FIG. 1 shows an embodiment of an illumination apparatus 1 according to the invention, which is mounted to a transport vehicle 2 and is disposed in transport position. In this transport position, the stand 3 of the holder unit 4 is disposed in a generally horizontal position, so that during transportation of the illumination apparatus 1 to a deployment location, no airflow from driving impacts the illumination apparatus 1, which can damage it. In this illustrated transport position, the illumination unit 5 is pivoted around a joint 8 relative to the stand 3, so that no component of the illumination apparatus 1 protrudes laterally beyond the vehicle 2. The illumination unit 5 is thus shown in its folded condition and can be spread by suitable means, which is apparent in FIG. 2. From FIG. 2 it is also evident that the stand 3 is provided with telescoping means, wherein a hand crank 6 is provided by means of which the stand 3 can be telescoped. Referring again to FIG. 1, the stand 3 is connected to a coupling unit 7 and the coupling unit is received in the receiver of the vehicle receiver hitch 28 of the vehicle 2. The coupling unit allows pivoting of the holder unit 4, including the stand 3 together with the illumination unit 5, which is evident from FIG. 2. According to the arrow 29, the holder unit 4 can be pivoted from its horizontal transport position into the vertical operating position shown in FIG. 2.

Figure 2:
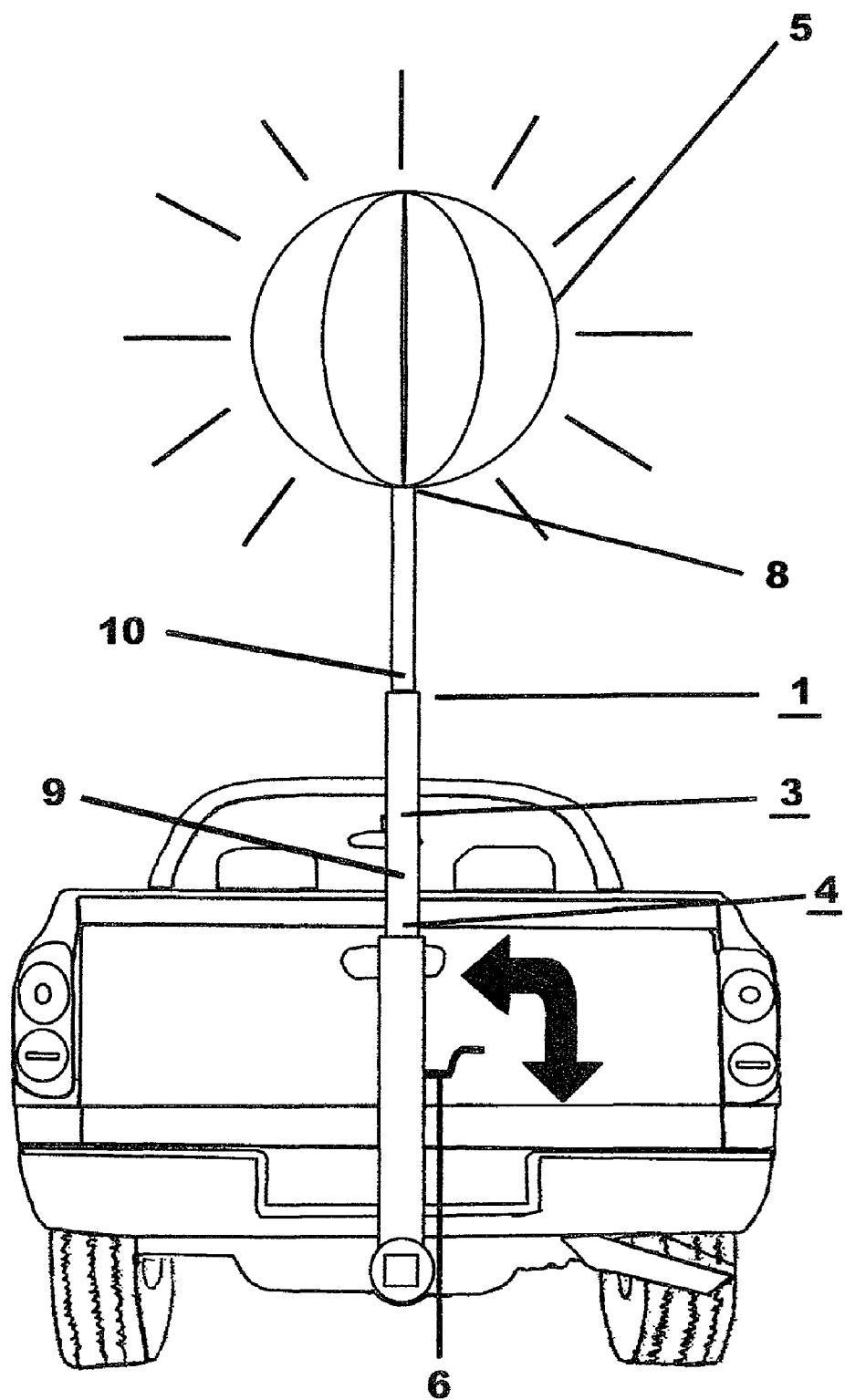
FIG. 2 is a perspective view of a preferred embodiment of the illumination apparatus mounted to a transport vehicle and disposed in operating position.

In FIG. 2, the illumination apparatus 1 is shown extended and in its generally vertical operating position. In this operating position, the shade of illumination unit 5 is spread by suitable means and the stand 3 of the holder unit 4 is extended. Two telescoping stages 9 and 10 are displayed in this embodiment, but it will be apparent that additional stages may be provided. The extension of the stand 3 is performed by operating the hand crank 6 after previous pivoting of the holder unit 4 from the horizontal transport position shown in FIG. 1 into the vertical operating position shown in FIG. 2 according to the arrow 29. Before extending the stand 3, the illumination unit 5 is preferably pivoted with reference to the stand 3 around the joint 8, and the shade of the illumination unit 5 is spread. Once the stand 3 is extended the illumination unit 5 may be disposed at an inconvenient height for the operator to reach.

Figure 3:
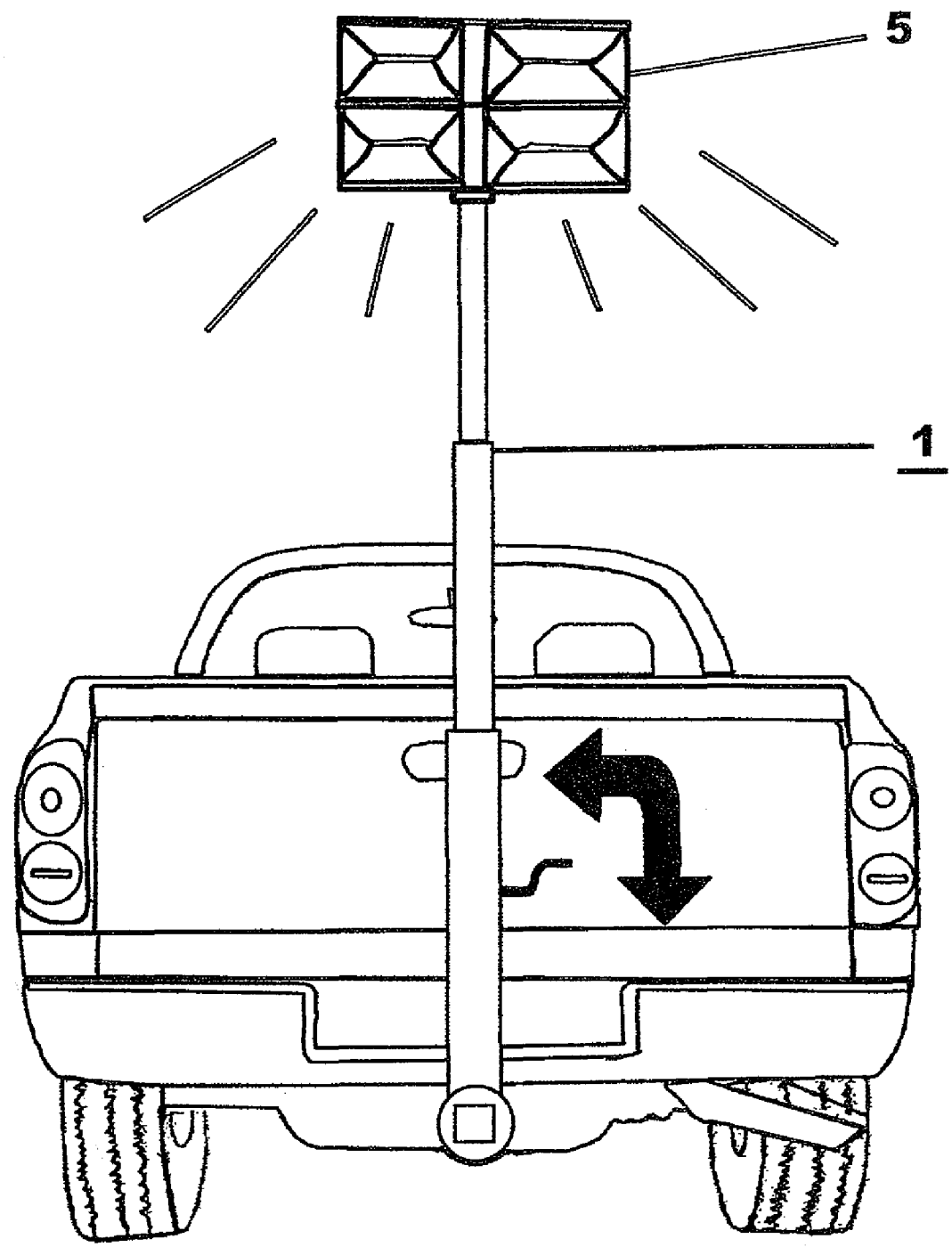
FIG. 3 is a perspective view of another preferred embodiment of the illumination apparatus mounted to a transport vehicle and disposed in operating position.
Figure 4:
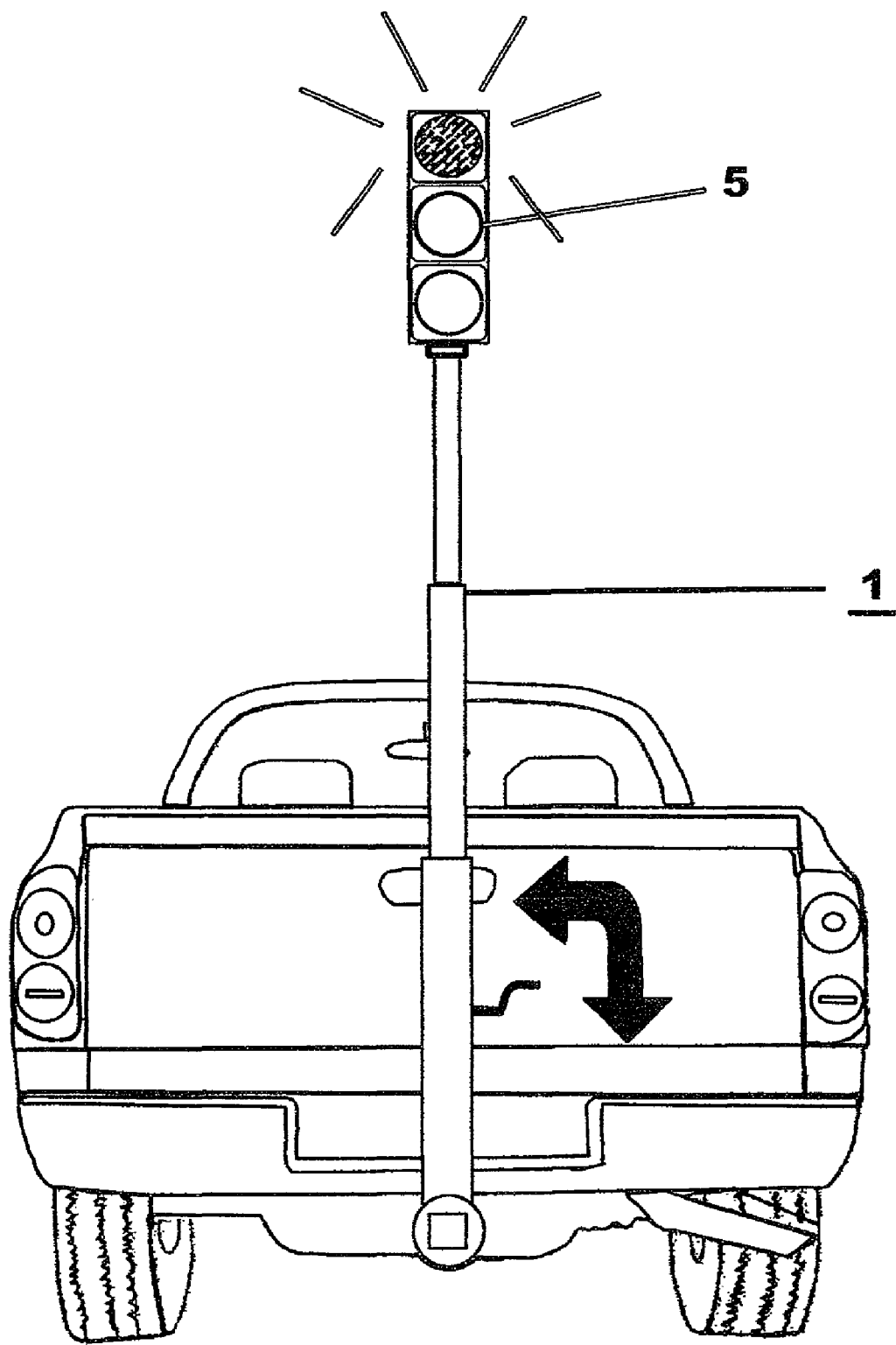
FIG. 4 is a perspective view of another preferred embodiment of the illumination apparatus mounted to a transport vehicle and disposed in operating position.
Figure 5:
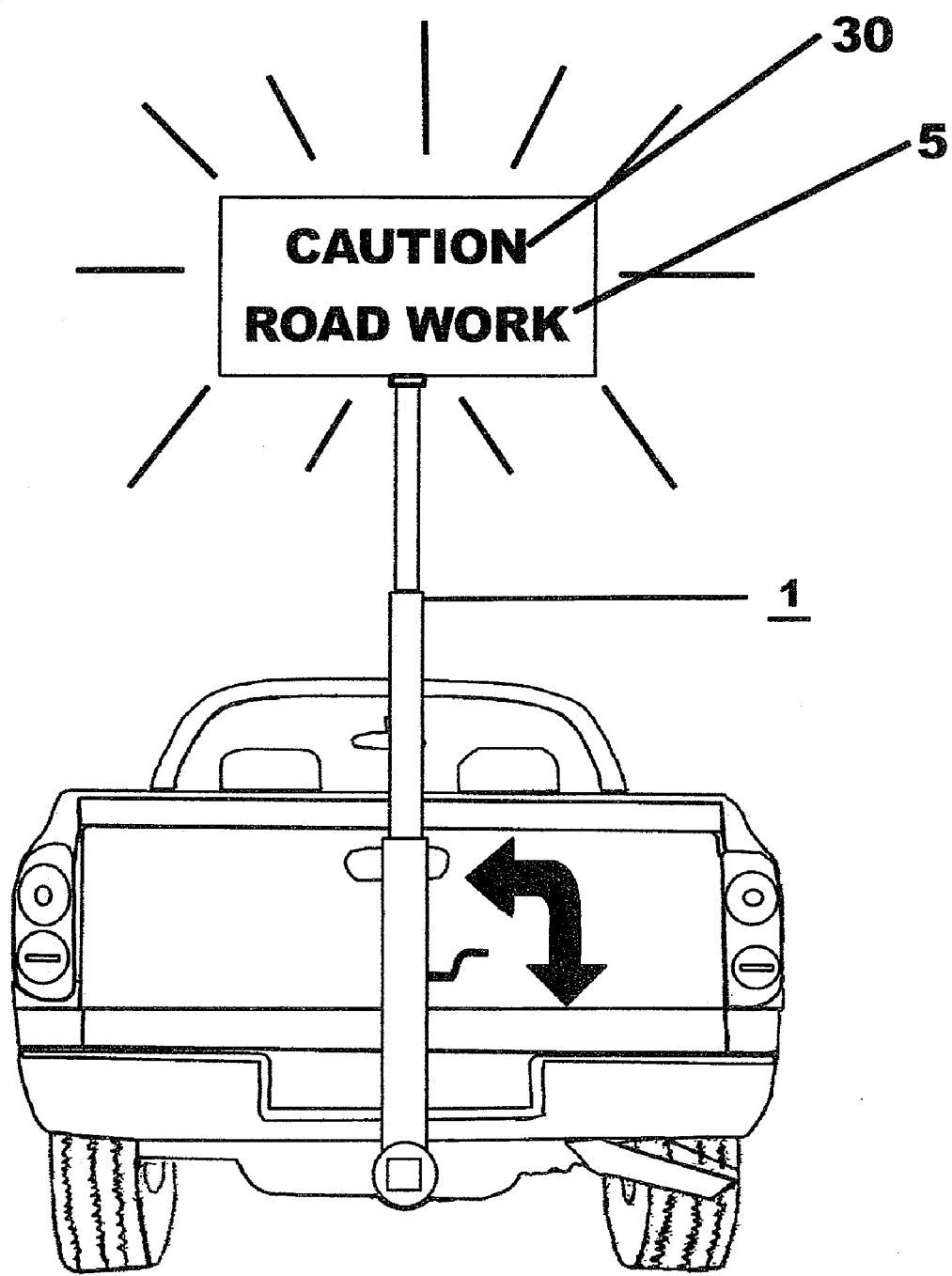
FIG. 5 is a perspective view of another preferred embodiment of the illumination apparatus mounted to a transport vehicle and disposed in operating position.

FIG. 3 shows an alternative embodiment of the illumination apparatus 1 in operating position, wherein the illumination apparatus 5 comprises a flood light. This embodiment may facilitate illumination of a construction site during darkness. Otherwise, the drawing designated FIG. 3 corresponds to the one of FIG. 2. Similarly, FIG. 4 shows another embodiment of the illumination apparatus 1, wherein the illumination unit 5 is comprises a signal light, which may serve to regulate traffic in a construction site. In like fashion, FIG. 5 shows another alternative embodiment of the illumination apparatus 1, in which the illumination unit 5 comprises a lighted warning sign, wherein the warning sign includes illuminated and blinking text 30, which informs traffic about road conditions ahead.

Figure 6:
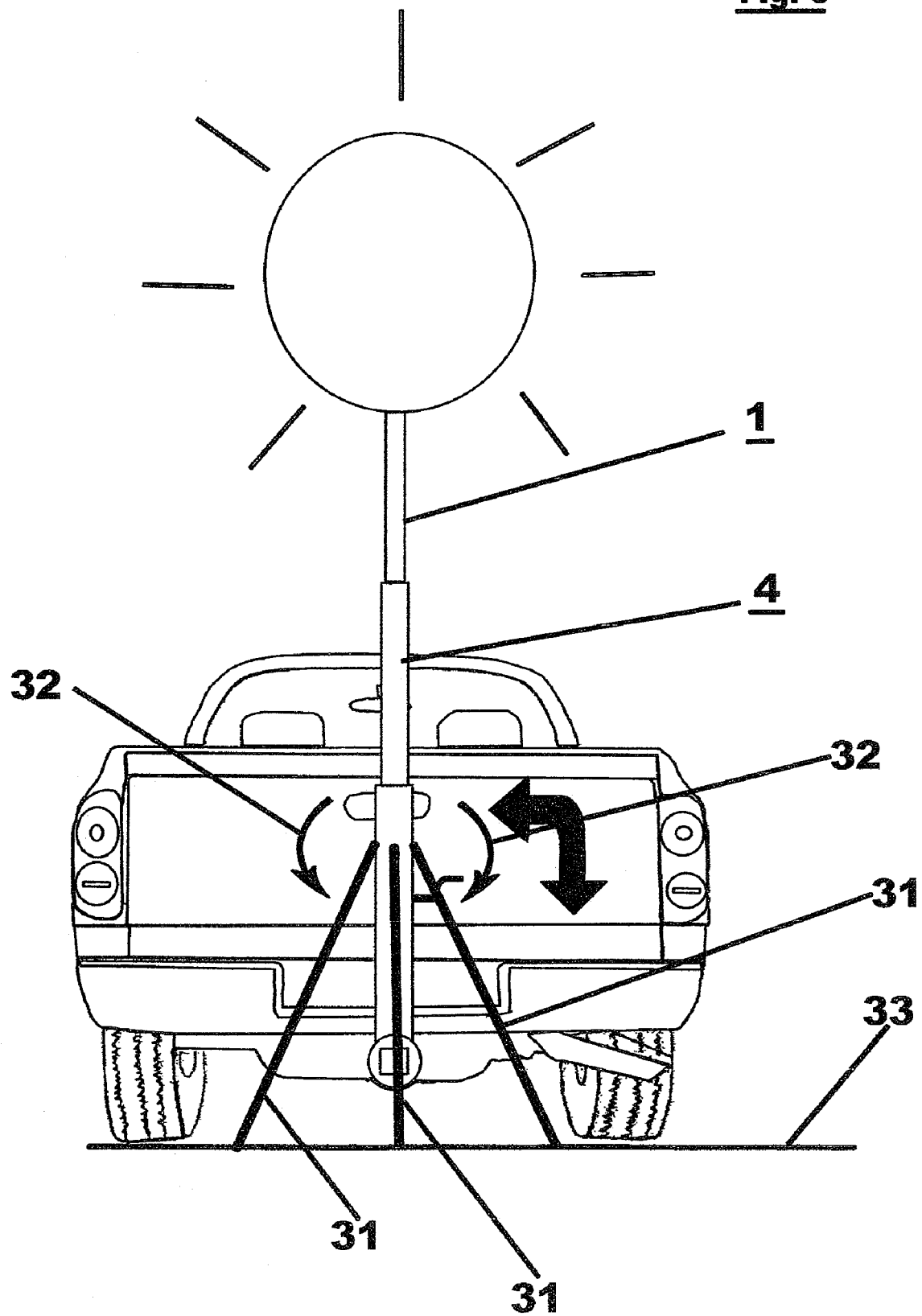
FIG. 6 is a perspective view of another preferred embodiment of the illumination apparatus mounted to a transport vehicle and disposed in operating position.

FIG. 6 depicts another embodiment of the illumination apparatus 1, in which the holder unit 4 further comprises three base elements 31 disposed at the base of the holder unit 4 and which serve to stabilize the apparatus. The base elements 31 are preferably pivotably connected to the holder unit 4 so they may be disposed adjacent the holder unit 4 when in transport position. When the illumination apparatus 1 is disposed in its operating position, the base elements 31 can be pivoted downward according to the arrows 32, resting on the ground 33 with their lower ends. The base elements 31 may be fixed in this position by suitable means.

FIG. 7 depicts the embodiment which is also depicted in FIG. 6. However, in FIG. 7 the illumination apparatus 1 is detached from the transport vehicle 2, so that the illumination apparatus 1 can remain at its deployment location, and can be connected there with a suitable energy supply means (which is not depicted). The base elements 31 hold the illumination apparatus 1 in a stable and erect operating position.

FIG. 8 shows a longitudinal sectional view through a coupling unit 7. The coupling unit 7 comprises an inner tube 11 and an outer tube 12, wherein the outer tube 12 is rotatably supported by slide elements 13 and 14 on the inner tube 11. The inner tube 11 is connected in a torque-proof manner to coupling elements 15, 16 and 25. (Coupling element 25 is not shown in FIG. 8, but is depicted in FIG. 9). As is better depicted in FIG. 9, coupling elements 15, 16 and 25 each have a square cross section. However, the side dimension for coupling element 15 is larger than the side dimension for coupling element 16 and the side dimension of coupling element 16 is larger than the side dimensions of coupling element 25. By means of the multiple disposition of coupling elements 15, 16 and 25, the coupling unit 7 serves as an adapter by providing respectively sized coupling elements 15, 16 and 25 corresponding to three typical sizes for receivers of receiver tow hitches. This increases the compatibility of the illumination apparatus with regard to a variety of transport vehicles with a variety of hitches. In the illustrated embodiment the coupling elements 15, 16 and 25 are connected, preferably by welding, with closed end of the inner tube 11.

Central to the inner tube 11 and the outer tube 12, a spring element 25 comprising a coil spring is provided between the tubes, and is welded to the outer tube 12 at one end 18, and to the inner tube 11 at the other end 19. When the outer tube 12 is rotated relative to the inner tube 11, a reversal force is created by the spring element 17, which is directed so that pivoting of the holder unit 4 from the generally horizontal transport position into the generally vertical operating position can be performed aided by the reversal force. A plate 20, on the end of the coupling unit 7 adjacent the holder unit 4, is connected to the holder unit 4, and is also connected, preferably by welding to the outer tube 12. At the other end of the coupling unit 7, where the coupling elements 15, 16 and 25 protrude from the inner tube 11, a flange ring 21 extends inward from the outer tube 12, so that the inner tube 11 cannot slide out of the outer tube 12. Furthermore, the outer tube 12 and also the inner tube 11 comprise an opening 22 and 35, respectively, through which an interlocking element 23 is inserted, and which fixes the illumination device in its vertical operating position as illustrated, for example, in FIG. 2. Additional openings in the outer tube 12 and the inner tube 11 (which are not depicted), in like fashion permit the holder unit to be fixed in its horizontal transport position as illustrated in FIG. 1. Thus, inadvertent rotation of the outer tube 12 relative to the inner tube 11 is avoided.

As noted earlier herein, FIG. 9 shows a schematic top view of the coupling unit 7, wherein the flange ring 21 of the outer tube 12 covers a portion of the inner tube 11. Additionally, coupling elements 15, 16, and 25 are depicted extending outward from the inner tube 11. Each of coupling elements 15, 16 and 25 has a square cross section, is a size corresponding to the size of one of the various common sizes for receivers of typical vehicle receiver hitches. Thus, the coupling unit 7 functions as an adaptor.

It is apparent from the above description that the invention provides an illumination apparatus which is simple to operate and which can be transported to the deployment location without the use of a trailer in tow, thereby improving transport safety. The embodiments described with reference to the figures illustrate the invention and do not limit it.

Additionally, the invention has been described in regard to its preferred embodiment. It will be apparent to those skilled in the art that the same may be varied in many ways without departing from the spirit and scope of the invention. All such modifications are intended to be included within the scope of the following claims.

I claim:

1. An illumination apparatus to mount in a receiver of a vehicle receiver hitch comprising:
    an illumination unit;
    a holder unit having two ends, and;
    a coupling unit;
    wherein said illumination unit is connected to one end of said holder unit and said coupling unit is connected to the other end of said holder unit and wherein said coupling unit comprises at least one coupling element disposed to be received in the receiver of a vehicle receiver hitch, and
    wherein said coupling unit comprises an inner tube and an outer tube, said inner tube rotatably supported in said outer tube, said inner tube fixed to said coupling element, said outer tube fixed to said holder unit wherein the rotation of the outer tube relative to said inner tube varies the orientation of said holder unit relative to said inner tube.

2. An illumination apparatus according to claim 1, wherein the coupling unit comprises a plurality of coupling elements each said element disposed to be received in a receiver of a vehicle receiver hitch.

3. An illumination apparatus to mount in a receiver of a vehicle receiver hitch comprising:
    an illumination unit;
    a holder unit having two ends, and;
    a coupling unit;
    wherein said illumination unit is connected to one end of said holder unit and said coupling unit is connected to the other end of said holder unit and wherein said coupling unit comprises at least one coupling element disposed to be received in the receiver of a vehicle receiver hitch;
    wherein the coupling unit comprises a plurality of coupling elements each said element disposed to be received in a receiver of a vehicle receiver hitch; and
    wherein said coupling unit comprises at least 3 coupling elements, said first coupling element having a square cross section with a side dimension of 1.25 inches, said second coupling element having a square cross section with a side dimension of 2 inches and said third coupling element having a square cross section with a side dimension of 2.5 inches, and wherein the three coupling elements are positioned within the coupling unit, so that the coupling elements are aligned substantially parallel with the axis of the coupling unit.

4. An illumination apparatus according to claim 1, wherein said illumination unit is pivotably connected to said holder unit.

5. An illumination apparatus according to claim 1, wherein the illumination unit comprises a lamp shade and at least one illuminant, said lamp shade being extendable.

6. An illumination apparatus according to claim 1, wherein said holder unit is rotatably connected to said coupling unit.

7. An illumination apparatus according to claim 1, wherein said coupling unit further comprises a slide element, said slide element being disposed between said inner tube and said outer tube.

8. An illumination apparatus according to claim 7, wherein said slide element comprises a slide ring.

9. An illumination apparatus according to claim 8, wherein said slide ring is made of Teflon.

10. An illumination apparatus according to claim 1, wherein said coupling unit further comprises a spring element having a first and second ends, said first end of said spring element connected to said outer tube, said second end of said spring element connected to said inner tube, wherein said spring element is biased to aid rotation of said outer tube relative to said inner tube.

11. An illumination apparatus according to claim 10, wherein said spring element is a coil spring.

12. An illumination apparatus according to claim 1, wherein said holder unit further comprises a stand, said stand being adjustable in length.

13. An illumination apparatus according to claim 12, wherein said stand comprises a plurality of telescoping sections.

14. An illumination apparatus according to claim 1, wherein said holder unit further comprises a plurality of base elements, wherein one end of each said base element is pivotably connected to said holder unit.

15. An illumination apparatus according to claim 1, wherein the illumination unit is connected to one end of the holder unit.

16. An illumination apparatus to mount in the receiver of a vehicle receiver hitch comprising: a coupling unit, said coupling unit comprising at least one coupling element disposed to be received in the receiver of a vehicle receiver hitch; an inner tube, one end of said inner tube fixed to said coupling element, and; an outer tube, wherein said inner tube is rotatably supported in said outer tube; an illumination unit, and; a holder unit having two ends, said first end of said holder unit connected to said illumination unit, said second end of said holder unit connected to said outer tube, wherein the rotation of said outer tube relative to said inner tube varies the orientation of said holder unit relative to said inner tube.

17. An illumination apparatus according to claim 16, wherein the coupling unit comprises a plurality of coupling elements each said element disposed to be received in a receiver of a vehicle receiver hitch.

18. An illumination apparatus according to claim 17, wherein said coupling unit comprises at least 3 coupling elements, said first coupling element having a square cross section with a side dimension of 1.25 inches, said second coupling element having a square cross section with a side dimension of 2 inches and said third coupling element having a square cross section with a side dimension of 2.5 inches.

19. An illumination apparatus according to claim 16, wherein said illumination unit is pivotably connected to said holder unit.

20. An illumination apparatus according to claim 16, wherein said coupling unit further comprises a slide element, said slide element being disposed between said inner tube and said outer tube.

21. An illumination apparatus according to claim 20, wherein said slide element comprises a slide ring.

22. An illumination apparatus according to claim 21, wherein said slide ring is made of Teflon.

23. An illumination apparatus according to claim 16, wherein said coupling unit further comprises a spring element having a first and second ends, said first end of said spring element connected to said outer tube, said second end of said spring element connected to said inner tube, wherein said spring element is biased to aid rotation of said outer tube relative to said inner tube.

24. An illumination apparatus according to claim 23, wherein said spring element is a coil spring.

25. An illumination apparatus according to claim 16, wherein said holder unit further comprises a stand, said stand being adjustable in length.

26. An illumination apparatus according to claim 25, wherein said stand comprises a plurality of telescoping sections.

27. An illumination apparatus according to claim 16, wherein said holder unit further comprises a plurality of base elements, wherein one end of each said base element is pivotably connected to said holder unit.

\* \* \* \* \*